United States Patent
Li et al.

(10) Patent No.: US 10,187,833 B2
(45) Date of Patent: Jan. 22, 2019

(54) METHOD AND APPARATUS FOR RUNNING NETWORK FUNCTION

(71) Applicant: Huawei Technologies Co., Ltd., Shenzhen (CN)

(72) Inventors: Yingtao Li, Shenzhen (CN); Yong Xie, Chengdu (CN); Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 15/357,140

(22) Filed: Nov. 21, 2016

(65) Prior Publication Data
US 2017/0070932 A1 Mar. 9, 2017

Related U.S. Application Data

(63) Continuation of application No. PCT/CN2014/077896, filed on May 20, 2014.

(51) Int. Cl.
*H04W 36/08* (2009.01)
*H04W 24/02* (2009.01)
(Continued)

(52) U.S. Cl.
CPC .......... *H04W 36/08* (2013.01); *H04W 24/02* (2013.01); *H04W 24/10* (2013.01);
(Continued)

(58) Field of Classification Search
CPC . H04W 36/08; H04W 24/02; H04W 36/0055; H04W 24/10; H04W 36/26; H04W 88/08; H04W 88/02
See application file for complete search history.

(56) References Cited

U.S. PATENT DOCUMENTS

2009/0143094 A1* 6/2009 Shen ............... H04W 8/245
455/550.1
2010/0082856 A1* 4/2010 Kimoto ............... H04L 47/10
710/45
(Continued)

FOREIGN PATENT DOCUMENTS

| CN | 1756440 A | 4/2006 |
| CN | 101873460 A | 10/2010 |
| CN | 103621140 A | 3/2014 |

OTHER PUBLICATIONS

Machine Translation and Abstract of Chinese Publication No. CN101873460, Oct. 27, 2010, 3 pages.
(Continued)

*Primary Examiner* — Omar J Ghowrwal
(74) *Attorney, Agent, or Firm* — Conley Rose, P.C.

(57) ABSTRACT

Embodiments of the present disclosure disclose a method and an apparatus for running a network function, and relate to the field of information technologies such that consistent network-wide service experience can be provided for a user service on different nodes in a network. The method includes receiving information sent by a source node, about a network function required by a user service, and running the network function if the network function is not running. The embodiments of the present disclosure are applicable to switching a user service from a source node to a target node.

18 Claims, 2 Drawing Sheets

---

A target node receives information, sent by a source node, about a network function required by a user service — 201

The target node runs the network function if the network function is not running — 202

(51) Int. Cl.
   *H04W 36/00* (2009.01)
   *H04W 24/10* (2009.01)
   *H04W 36/26* (2009.01)
   *H04W 88/08* (2009.01)
   *H04W 88/02* (2009.01)

(52) U.S. Cl.
   CPC ........ *H04W 36/0055* (2013.01); *H04W 36/26* (2013.01); *H04W 88/02* (2013.01); *H04W 88/08* (2013.01)

(56) References Cited

U.S. PATENT DOCUMENTS

2014/0351575 A1* 11/2014 Barriga ................ H04L 63/061
                                                            713/155
2016/0180445 A1*  6/2016 Tanaka .............. G06F 17/30026
                                                            705/26.8

OTHER PUBLICATIONS

Foreign Communication From a Counterpart Application, PCT Application No. PCT/CN2014/077896, English Translation of International Search Report dated Mar. 2, 2015, 2 pages.
Foreign Communication From a Counterpart Application, PCT Application No. PCT/CN2014/077896, English Translation of Written Opinion dated Mar. 2, 2015, 8 pages.

* cited by examiner

METHOD AND APPARATUS FOR RUNNING NETWORK FUNCTION

CROSS-REFERENCE TO RELATED APPLICATIONS

This application is a continuation of International Application No. PCT/CN2014/077896, filed on May 20, 2014, the disclosure of which is hereby incorporated by reference in its entirety.

TECHNICAL FIELD

The present disclosure relates to the field of information technologies, and in particular, to a method and an apparatus for running a network function.

BACKGROUND

In a current wireless network system, a function of a network device node is generally unchanged. After a device vendor sells a device to an operator, the device has a fixed network function, and if the device vendor does not update or upgrade the device, the network function of the device generally remains unchanged. Generally, the network device node is a wireless access point (AP).

Currently, in wireless communication, a network function is provided for a user service using a network as a center. A user can perform communication only using a network, a technology, and a network function that are supported in a current position. For example, a high-definition video conversation is used for a user service in a position. When the user service moves to a position in which a high-definition video conversation function is not supported, the user cannot carry on the high-definition video conversation any more.

However, when a network function is provided for a user service using the network as a center, and when the user service is switched from a source node to a target node in a moving process in the network, there is a possibility that a capability of the target node does not meet a current network function requirement of the user service. Therefore, the same network function cannot be obtained when the user service is switched from the source node to the target node, and further, consistent network-wide service experience cannot be provided for the user service on different nodes in the network.

SUMMARY

Embodiments of the present disclosure provide a method and an apparatus for running a network function such that consistent network-wide service experience can be provided for a user service on different nodes in a network.

Technical solutions used in the embodiments of the present disclosure are as follows According to a first aspect, an embodiment of the present disclosure provides a method for running a network function, including receiving information, sent by a source node, about a network function required by a user service, where the information about the network function carries identifier information corresponding to the network function, and running the network function when the network function is not already running.

With reference to the first aspect, in a first possible implementation manner of the first aspect, the information about the network function carries at least one type of the following information a name of the network function, an identity of the network function, a version of the network function, or parameter information required for running the network function.

With reference to the first aspect or the first possible implementation manner of the first aspect, in a second possible implementation manner of the first aspect, the running the network function when the network function is not already running includes downloading a module corresponding to the network function and running the network function.

With reference to the second possible implementation manner of the first aspect, in a third possible implementation manner of the first aspect, after the downloading a module corresponding to the network function and running the network function, the method further includes uninstalling the module corresponding to the network function when the user service is switched to another node.

With reference to the first aspect, the first possible implementation manner of the first aspect, the second possible implementation manner of the first aspect, or the third possible implementation manner of the first aspect, in a fourth possible implementation manner of the first aspect, the receiving information, sent by a source node, about a network function required by a user service includes receiving service quality required by the user service and the information, sent by the source node, about the network function required by the user service, and the step of the running the network function that is not running includes running the network function if the service quality required by the user service is achieved.

With reference to the fourth possible implementation manner of the first aspect, in a fifth possible implementation manner of the first aspect, the method further includes, if the service quality required by the user service is not achieved, sending, to the source node, feedback information indicating that switching of the user service is not allowed.

With reference to the first aspect, the first possible implementation manner of the first aspect, the second possible implementation manner of the first aspect, the third possible implementation manner of the first aspect, or the fourth possible implementation manner of the first aspect, in a sixth possible implementation manner of the first aspect, after the running the network function, the method further includes sending, to the source node, feedback information indicating that switching of the user service is allowed.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner of the first aspect, the information about the network function is protocol feature information.

According to a second aspect, an embodiment of the present disclosure provides an apparatus for running a network function, including a receiving unit configured to receive information, sent by a source node, about a network function required by a user service, where the information about the network function carries identifier information corresponding to the network function, and a running unit configured to run the network function when the network function received by the receiving unit is not running.

With reference to the second aspect, in a first possible implementation manner of the second aspect, the information, received by the receiving unit, about the network function carries at least one type of the following information a name of the network function, or an identity of the network function, or a version of the network function, or parameter information required for running the network function.

With reference to the second aspect or the first possible implementation manner of the second aspect, in a second possible implementation manner of the second aspect, the apparatus further includes a downloading unit, the downloading unit is configured to download a module corresponding to the network function received by the receiving unit, and the running unit is configured to run the network function downloaded by the downloading unit.

With reference to the second possible implementation manner of the second aspect, in a third possible implementation manner of the second aspect, the apparatus further includes an uninstallation unit, and the uninstallation unit is configured to, when the user service is switched to another node, uninstall the module that is corresponding to the network function and that is downloaded by the downloading unit.

With reference to the second aspect, the first possible implementation manner of the second aspect, the second possible implementation manner of the second aspect, or the third possible implementation manner of the second aspect, in a fourth possible implementation manner of the second aspect, the receiving unit is configured to receive service quality required by the user service and the information, sent by the source node, about the network function required by the user service, and the running unit is configured to run the network function when the service quality that is required by the user service and that is received by the receiving unit is achieved.

With reference to the fourth possible implementation manner of the second aspect, in a fifth possible implementation manner of the second aspect, the apparatus further includes a sending unit, and the sending unit is configured to send, to the source node when the service quality that is required by the user service and that is received by the receiving unit is not achieved, feedback information indicating that switching of the user service is not allowed.

With reference to the second aspect, the first possible implementation manner of the second aspect, the second possible implementation manner of the second aspect, the third possible implementation manner of the second aspect, or the fourth possible implementation manner of the second aspect, in a sixth possible implementation manner of the second aspect, the apparatus further includes a sending unit, and the sending unit is further configured to send, to the source node, feedback information indicating that switching of the user service is allowed.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner of the second aspect, the information, received by the receiving unit, about the network function is protocol feature information.

According to a third aspect, an embodiment of the present disclosure provides a target node, including a receiver configured to receive information, sent by a source node, about a network function required by a user service, where the information about the network function carries identifier information corresponding to the network function, and a processor configured to run the network function when the network function received by the receiver is not running.

With reference to the third aspect, in a first possible implementation manner of the third aspect, the information, received by the receiver, about the network function carries at least one type of the following information a name of the network function, or an identity of the network function, or a version of the network function, or parameter information required for running the network function.

With reference to the third aspect or the first possible implementation manner of the third aspect, in a second possible implementation manner of the third aspect, the processor is further configured to download a module corresponding to the network function received by the receiver, and run the network function.

With reference to the second possible implementation manner of the third aspect, in a third possible implementation manner of the third aspect, the processor is further configured to uninstall the module corresponding to the network function when the user service is switched to another node.

With reference to the third aspect, the first possible implementation manner of the third aspect, the second possible implementation manner of the third aspect, or the third possible implementation manner of the third aspect, in a fourth possible implementation manner of the third aspect, the receiver is configured to receive service quality required by the user service and the information, sent by the source node, about the network function required by the user service, and the processor is configured to run the network function when the service quality that is required by the user service and that is received by the receiver is achieved.

With reference to the fourth possible implementation manner of the third aspect, in a fifth possible implementation manner of the third aspect, the apparatus further includes a transmitter, and the transmitter is configured to send, to the source node when the service quality that is required by the user service and that is received by the receiver is not achieved, feedback information indicating that switching of the user service is not allowed.

With reference to the third aspect, the first possible implementation manner of the third aspect, the second possible implementation manner of the third aspect, the third possible implementation manner of the third aspect, or the fourth possible implementation manner of the third aspect, in a sixth possible implementation manner of the third aspect, the apparatus further includes a transmitter, and the sending unit is further configured to send, to the source node, feedback information indicating that switching of the user service is allowed.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, or the sixth possible implementation manner of the third aspect, in a seventh possible implementation manner of the third aspect, the information, received by the receiver, about the network function is protocol feature information.

According to the method and the apparatus for running a network function provided in the embodiments of the present disclosure, information, sent by a source node, about a network function required by a user service is received, and the network function is run if the network function is not running. Currently, a network function is provided for a user service using a network as a center. By contrast, in the present disclosure, when a target node does not meet a requirement of a network function required by a user service, the target node downloads the corresponding network function from a server and runs the network function such that the same network function can be obtained when the user service is switched from the source node to the target node. Therefore, a required network function can be provided for a user service using the user service as a center, and further, consistent network-wide service experience can be provided for the user service on different nodes in a network.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the advantages of the technical solutions of the present disclosure clearer, the following describes the present disclosure in detail with reference to the accompanying drawings and embodiments.

Figure 1:
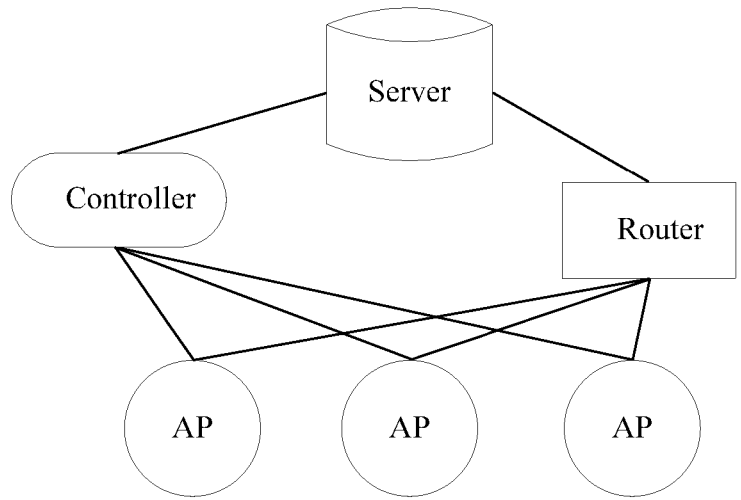
FIG. 1 is a schematic diagram of an architecture of a system for running a network function according to an embodiment of the present disclosure.

The technical solution provided in the embodiments of the present disclosure may be used in an architecture of a system for running a network function, as shown in FIG. 1. In FIG. 1, an AP is a wireless access point, and a user service may access a network using the AP such that the user service obtains various communication services provided by the network. The AP is an end node of the network and a direct interface between the network and the user service. The AP may communicate with the user service using multiple wireless communications technologies such as a third generation mobile communications technology (3G), a fourth generation mobile communications technology (4G), and a Wireless Fidelity (WIFI) communications technology. In the embodiments of the present disclosure, the AP may be a source node, or may be a target node. In FIG. 1, Controller is a controller of the network and is configured to control a behavior of performing an access service by each AP in the network, including behaviors such as a procedure, a resource, and a function. As an executor, the AP may be under the control of Controller and report a status of the AP. In FIG. 1, Router is a router in the network, is generally connected using a fixed line, and is mainly configured to forward data, which includes forwarding, to another AP in the network, a packet that needs to be uploaded by an AP, and forwarding a downlink packet in the network to a corresponding AP. In FIG. 1, Server is a server in the network, and in the embodiments of the present disclosure, Server may be a server that provides software function downloading.

Figure 2:
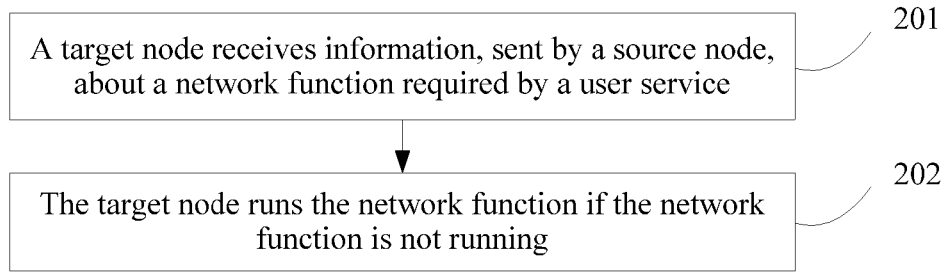
FIG. 2 is a flowchart of a method for running a network function according to an embodiment of the present disclosure.

An embodiment of the present disclosure provides a method for running a network function. As shown in FIG. 2, the method includes the following steps.

201. A target node receives information, sent by a source node, about a network function required by a user service.

The information about the network function carries identifier information corresponding to the network function, where an identifier corresponding to the network function may be a name, an identity or identity number of the network function. In this embodiment of the present disclosure, the information about the network function required by the user service may carry identifier information corresponding to one network function required by the user service, or may carry identifier information corresponding to each of multiple network functions required by the user service, which is not limited in this embodiment of the present disclosure.

For this embodiment of the present disclosure, the network function required by the user service refers to a capability used when a service is provided for the user service, and the network function required by the user service may be a network function required by the user service itself, or may be a function defined in a protocol, which is not limited in this embodiment of the present disclosure. The network function required by the user service may be any one or any combination of network functions such as a compression function, a deep package inspection (DPI) function, a coding/decoding function, and various algorithm functions. The algorithm function may be a security algorithm function or the like. In this embodiment of the present disclosure, the network function required by the user service is a network function that can be loaded using software.

202. The target node runs the network function when the network function is not already running.

The network function that is not running may be a network function that the target node does not have, or may be a network function that the target node has but is not running. In this embodiment of the present disclosure, if the network function that is not running is a network function that the target node does not have, the target node downloads, from a server, the network function that the target node does not have, and runs the downloaded network function, if the network function that is not running is a network function that the target node has but is not running, the target node directly runs the network function.

In one embodiment, when multiple network functions that are not running exist in the network functions, the target node may simultaneously run these network functions that are not running to meet a service requirement of switching the user service to the target node.

In one embodiment, when multiple network functions that are not running exist in the network functions, and both a network function that the target node does not have and a network function that the target node has but is not running exist in these network functions that are not running, the target node may first download the network function that the target node does not have and that is in these network functions that are not running, and then run the downloaded network function and the network function that the target node has but is not running.

For example, in a wireless communication process of the user service, a special encryption algorithm or an integrity secrecy algorithm may be used on an air interface, to implement secure communication of the user service. In this embodiment of the present disclosure, when the user service is to be switched from the source node to the target node, the source node sends, to the target node, information about a network function that is required by the user service and that provides the special encryption algorithm or the integrity secrecy algorithm such that the target node determines whether to run the network function that provides the special encryption algorithm or the integrity secrecy algorithm. If the target node does not have the network function that provides the special encryption algorithm or the integrity secrecy algorithm, the target node downloads, from the server, the network function that provides the special encryption algorithm or the integrity secrecy algorithm, and runs the network function that provides the special encryption algorithm or the integrity secrecy algorithm such that the user service can be switched to the target node and consistent network-wide service experience can be provided for the user service on different nodes in a network.

For this embodiment of the present disclosure, before step 202, the method may further include determining, by the target node, whether the network function is running, or determining, by a controller, whether the network function is running on the target node.

For this embodiment of the present disclosure, if the controller takes overall control, the controller may determine whether the network function is running on the target node. In this embodiment of the present disclosure, the controller has related information corresponding to each node controlled by the controller, and therefore, the controller may directly determine whether a network function that is not run by the target node exists in the network function required by the user service, and feed back a determining result to the target node.

For this embodiment of the present disclosure, if the controller takes overall control, the controller may further control the user service to be switched from the source node to the target node. The controller may send a command notification to the target node such that the user service is switched from the source node to the target node.

According to the method for running a network function provided in this embodiment of the present disclosure, information, sent by a source node, about a network function required by a user service is received, and the network function is run if the network function is not running. Currently, a network function is provided for a user service using a network as a center. By contrast, in this embodiment of the present disclosure, when a target node does not meet a requirement of a network function required by a user service, the target node downloads the corresponding network function from a server and runs the network function such that the same network function can be obtained when the user service is switched from the source node to the target node. Therefore, a required network function can be provided for a user service using the user service as a center, and further, consistent network-wide service experience can be provided for the user service on different nodes in a network.

Figure 3:
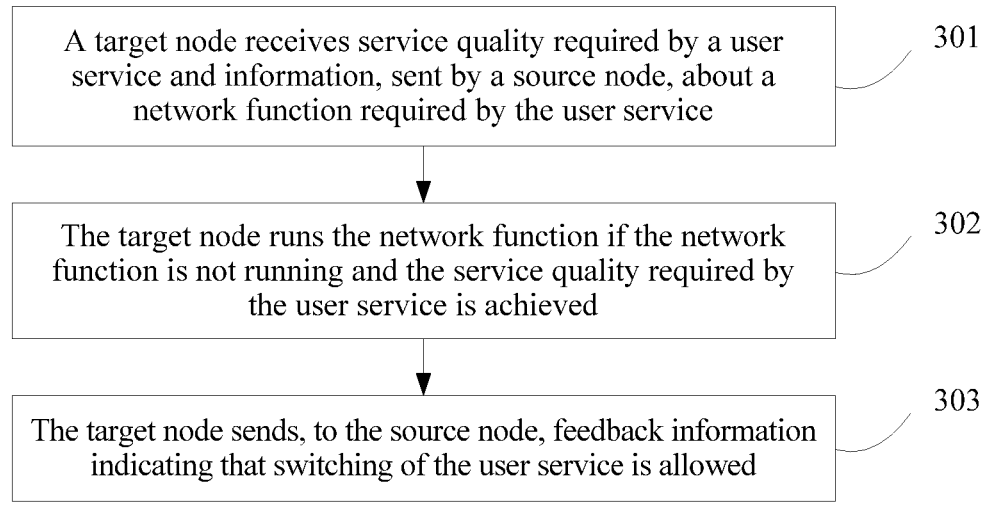
FIG. 3 is a flowchart of another method for running a network function according to an embodiment of the present disclosure.

As a specific illustration of the method shown in FIG. 2, another method for running a network function is provided in an embodiment of the present disclosure. As shown in FIG. 3, the method includes the following steps.

301. A target node receives service quality required by a user service and information, sent by a source node, about a network function required by the user service.

The information about the network function carries at least one type of the following information a name of the network function, an identity of the network function, a version of the network function, or parameter information required for running the network function.

For this embodiment of the present disclosure, the network function required by the user service refers to a capability used when a service is provided for the user service, and the network function required by the user service may be a network function required by the user service itself, or may be a function defined in a protocol, which is not limited in this embodiment of the present disclosure. The network function required by the user service may be any one or any combination of network functions such as a compression function, a DPI function, a coding/decoding function, and various algorithm functions. The algorithm function may be a security algorithm function or the like. In this embodiment of the present disclosure, the network function required by the user service is a network function that can be loaded using software.

For this embodiment of the present disclosure, the service quality required by the user service may be any one or any combination of service quality such as bandwidth required by the user service, a throughput required by the user service, a transmission delay required by the user service, or an error rate required by the user service.

302. The target node runs the network function if the network function is not running and the service quality required by the user service is achieved.

The network function that is not running may be a network function that the target node does not have, or may be a network function that the target node has but is not running. In this embodiment of the present disclosure, the target node can further provide the network function required by the user service only when the target node can achieve the service quality required by the user service.

In one embodiment, step 302 may further be that the target node downloads a module corresponding to the network function and runs the network function.

For this embodiment of the present disclosure, when a network function that is not run by the target node is a network function that the target node does not have, the target node downloads, from a server, a module corresponding to the network function that is not running, and runs the downloaded network function such that the target node can run the network function required by the user service, and further, consistent network-wide service experience can be provided for the user service on different nodes in a network.

For this embodiment of the present disclosure, if step 302 is that the target node downloads a module corresponding to the network function and runs the network function, after step 302, the method may further include uninstalling the module corresponding to the network function when the user service is switched to another node. In this embodiment of the present disclosure, the temporarily downloaded module of the network function is uninstalled such that a case in which too much of a memory of the target node is occupied can be avoided, and the target node can run the network function with improved efficiency.

In one embodiment, step 302 may be that when the network function that is not run by the target node is a network function that the target node has but is not running, the target node directly runs the network function.

For this embodiment of the present disclosure, when the network function that is not run by the target node is a network function that the target node has but is not running, the target node directly runs the network function such that the target node can run the network function required by the user service, and further, consistent network-wide service experience can be provided for the user service on different nodes in a network.

In one embodiment, when there are multiple network functions that are not running, the target node may simultaneously run these network functions that are not running to meet a service requirement of switching the user service to the target node.

In one embodiment, when there are multiple network functions that are not running, and both a network function that the target node does not have and a network function that the target node has but is not running exist in these network functions that are not running, the target node may first download the network function that the target node does not have and that is in these network functions that are not running, and then run the downloaded network function and the network function that the target node has but is not running.

For this embodiment of the present disclosure, before step 302, the method may include determining, by the target node, whether the network function is running, or determining, by a controller, whether the network function is running on the target node.

For this embodiment of the present disclosure, if the controller takes overall control, the controller may determine whether the network function is running on the target node. In this embodiment of the present disclosure, the controller has related information corresponding to each node controlled by the controller, and therefore, the controller may directly determine whether a network function that is not run by the target node exists in the network function required by the user service, and feed back a determining result to the target node.

For this embodiment of the present disclosure, if the controller takes overall control, the controller may further control the user service to be switched from the source node to the target node. The controller may send a command notification to the target node such that the user service is switched from the source node to the target node.

For this embodiment of the present disclosure, before step 302, the method may further include if the network function is not running, determining, by the target node, whether the service quality required by the user service is achieved, or if the network function is not running, determining, by the controller, whether the target node achieves the service quality required by the user service.

For this embodiment of the present disclosure, if the controller takes overall control, the controller may determine whether a network function that is not running exists in the network function. In this embodiment of the present disclosure, the controller has related information corresponding to each node controlled by the controller, and therefore, the controller may directly determine whether the target node can achieve the service quality required by the user service, and feed back a determining result to the target node.

For this embodiment of the present disclosure, if the controller takes overall control, the controller may further control the user service to be switched from the source node to the target node. The controller may send a command notification to the target node such that the user service is switched from the source node to the target node.

For this embodiment of the present disclosure, after step 302, the method may further include, if the service quality required by the user service is not achieved, sending, by the target node to the source node, feedback information indicating that switching of the user service is not allowed.

For this embodiment of the present disclosure, when the target node does not achieve the service quality required by the user service, the user service cannot be switched to the target node, and therefore, the target node sends, to the source node, the feedback information indicating that switching of the user service is not allowed such that the user service can be switched to another node.

303. The target node sends, to the source node, feedback information indicating that switching of the user service is allowed.

For this embodiment of the present disclosure, when the target node runs the network function, the target node can provide the network function required by the user service and achieve the service quality required by the user service. In this case, the user service can be switched to the target node. Therefore, the target node sends, to the source node, the feedback information indicating that switching of the user service is allowed such that the user service can be switched to the target node.

For example, in a wireless communication process of the user service, a special encryption algorithm or an integrity secrecy algorithm may be used on an air interface, to implement secure communication of the user service. In this embodiment of the present disclosure, when the user service is to be switched from the source node to the target node, the source node sends, to the target node, information about a network function that is required by the user service and that provides the special encryption algorithm or the integrity secrecy algorithm such that the target node determines whether to run the network function that provides the special encryption algorithm or the integrity secrecy algorithm. If the target node does not have the network function that provides the special encryption algorithm or the integrity secrecy algorithm, the target node downloads, from the server, the network function that provides the special encryption algorithm or the integrity secrecy algorithm, and runs the network function that provides the special encryption algorithm or the integrity secrecy algorithm such that the user service can be switched to the target node and consistent network-wide service experience can be provided for the user service on different nodes in a network.

In one embodiment, the network function may include a protocol feature.

For example, in the wireless communication process of the user service, the source node performs communication using a first protocol version and the target node performs communication using a second protocol version. If a version number of the first protocol version is later than a version number of the second protocol version, the user service cannot be switched from the source node to the target node using the existing technical solution. In this embodiment of the present disclosure, when the user service is to be switched from the source node to the target node, the source node sends a protocol version feature required by the user service to the target node such that the target node determines whether the target node has the protocol version feature required by the user service. If a protocol version feature that the target node does not have exists in the protocol version feature required by the user service, the target node downloads, from the server, the protocol version feature that the target node does not have, that is, the target node updates the second protocol version such that the user service can be switched to the target node and consistent network-wide service experience can be provided for the user service on different nodes in a network.

According to the method for running a network function provided in this embodiment of the present disclosure, information, sent by a source node, about a network function required by a user service is received, and the network function is run if the network function is not running. Currently, a network function is provided for a user service using a network as a center. By contrast, in this embodiment of the present disclosure, when a target node does not meet a requirement of a network function required by a user service, the target node downloads the corresponding network function from a server and runs the network function such that the same network function can be obtained when the user service is switched from the source node to the target node. Therefore, a required network function can be provided for a user service using the user service as a center, and further, consistent network-wide service experience can be provided for the user service on different nodes in a network.

Further, in the method for running a network function provided in this embodiment of the present disclosure, a module corresponding to a network function that is not running is downloaded such that a target node can run a network function required by a user service, and further, consistent network-wide service experience can be provided for the user service on different nodes in a network, the temporarily downloaded module of the network function is uninstalled such that a case in which too much of a memory of the target node is occupied can be avoided, and the target node can run the network function with improved efficiency, the target node directly runs a network function that the target node has but is not running such that the target node can run the network function required by the user service.

Figure 4:
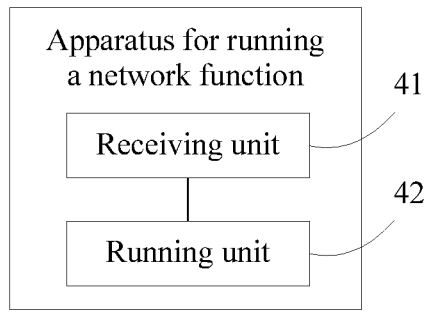
FIG. 4 is a schematic structural diagram of an apparatus for running a network function according to an embodiment of the present disclosure.

Further, as specific implementation of the methods shown in FIG. 2 and FIG. 3, an apparatus for running a network function is provided in an embodiment of the present disclosure. As shown in FIG. 4, an entity of the apparatus may be a target node such as an AP, and the apparatus includes a receiving unit 41 and a running unit 42.

The receiving unit 41 is configured to receive information, sent by a source node, about a network function required by a user service.

The information about the network function carries identifier information corresponding to the network function.

The running unit 42 is configured to run the network function when the network function received by the receiving unit 41 is not running.

The information, received by the receiving unit 41, about the network function carries at least one type of the following information a name of the network function, an identity of the network function, a version of the network function, or parameter information required for running the network function.

Figure 5:
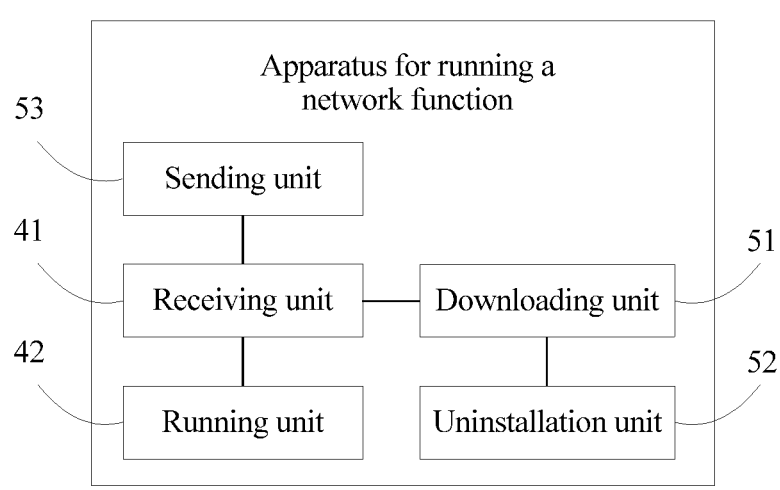
FIG. 5 is a schematic structural diagram of another apparatus for running a network function according to an embodiment of the present disclosure.

As shown in FIG. 5, the apparatus further includes a downloading unit 51.

The downloading unit 51 is configured to download a module corresponding to the network function received by the receiving unit 41.

The running unit 42 is configured to run the network function downloaded by the downloading unit 51.

In one embodiment, the apparatus may further include an uninstallation unit 52.

The uninstallation unit 52 is configured to when the user service is switched to another node, uninstall the module corresponding to the network function downloaded by the downloading unit 51.

The receiving unit 41 is configured to receive service quality required by the user service and the information, sent by the source node, about the network function required by the user service.

The running unit 42 is configured to run the network function when the service quality that is required by the user service and that is received by the receiving unit 41 is achieved.

In one embodiment, the apparatus may further include a sending unit 53.

The sending unit 53 is configured to send, to the source node when the service quality that is required by the user service and that is received by the receiving unit 41 is not achieved, feedback information indicating that switching of the user service is not allowed.

The sending unit 53 is further configured to send, to the source node, feedback information indicating that switching of the user service is allowed.

The information, received by the receiving unit 41, about the network function is protocol feature information.

According to the apparatus for running a network function provided in this embodiment of the present disclosure, a receiving unit receives information, sent by a source node, about a network function required by a user service, and a running unit runs the network function if the network function received by the receiving unit is not running. Currently, a network function is provided for a user service using a network as a center. By contrast, in this embodiment of the present disclosure, when a target node does not meet a requirement of a network function required by a user service, the target node downloads the corresponding network function from a server and runs the network function such that the same network function can be obtained when the user service is switched from the source node to the target node. Therefore, a required network function can be provided for a user service using the user service as a center, and further, consistent network-wide service experience can be provided for the user service on different nodes in a network.

Further, according to the apparatus for running a network function provided in this embodiment of the present disclosure, a module corresponding to a network function that is not running is downloaded such that a target node can run a network function required by a user service, and further, consistent network-wide service experience can be provided for the user service on different nodes in a network, the temporarily downloaded module of the network function is uninstalled such that a case in which too much of a memory of the target node is occupied can be avoided, and the target node can run the network function with improved efficiency, the target node directly runs a network function that the target node has but is not running such that the target node can run the network function required by the user service.

It should be noted that, for other corresponding descriptions corresponding to the units in the apparatus for running a network function provided in this embodiment of the present disclosure, reference may be made to corresponding descriptions in FIG. 2 and FIG. 3, and details are not described herein again.

Figure 6:
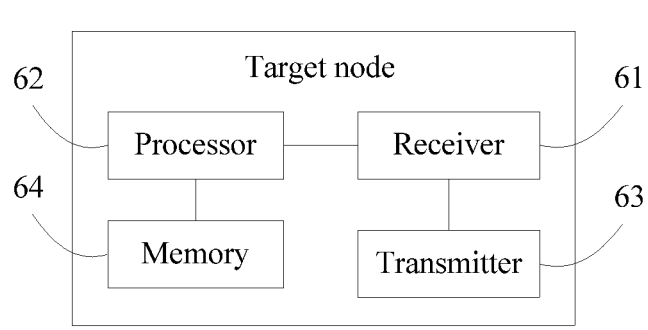
FIG. 6 is a schematic structural diagram of a target node according to an embodiment of the present disclosure.

A target node is further provided in an embodiment of the present disclosure. As shown in FIG. 6, the target node includes a receiver 61, a processor 62, a transmitter 63, and a memory 64, where the memory 64 is connected to the processor 62.

The receiver 61 is configured to receive information, sent by a source node, about a network function required by a user service.

The information about the network function carries identifier information corresponding to the network function.

The processor 62 is configured to run the network function when the network function received by the receiver 61 is not running.

The information, received by the receiver 61, about the network function carries at least one type of the following information: a name of the network function, an identity of the network function, a version of the network function, or parameter information required for running the network function.

The processor 62 is further configured to download a module corresponding to the network function received by the receiver 61, and run the network function.

The processor 62 is further configured to uninstall the module corresponding to the network function when the user service is switched to another node.

The receiver 61 is configured to receive service quality required by the user service and the information, sent by the source node, about the network function required by the user service.

The processor 62 is configured to run the network function when the service quality that is required by the user service and that is received by the receiver 61 is achieved.

In one embodiment, the apparatus may further include the transmitter 63.

The transmitter 63 is configured to send, to the source node when the service quality that is required by the user service and that is received by the receiver 61 is not achieved, feedback information indicating that switching of the user service is not allowed.

The transmitter 63 is further configured to send, to the source node, feedback information indicating that switching of the user service is allowed.

The information, received by the receiver 61, about the network function is protocol feature information.

In the target node provided in this embodiment of the present disclosure, a receiver receives information, sent by a source node, about a network function required by a user service, and a processor runs the network function if the network function received by the receiver is not running. Currently, a network function is provided for a user service using a network as a center. By contrast, in this embodiment of the present disclosure, when a target node does not meet a requirement of a network function required by a user service, the target node downloads the corresponding network function from a server and runs the network function such that the same network function can be obtained when the user service is switched from the source node to the target node. Therefore, a required network function can be provided for a user service using the user service as a center, and further, consistent network-wide service experience can be provided for the user service on different nodes in a network.

Further, in the target node provided in this embodiment of the present disclosure, a module corresponding to a network function that is not running is downloaded such that a target node can run a network function required by a user service, and further, consistent network-wide service experience can be provided for the user service on different nodes in a network, the temporarily downloaded module of the network function is uninstalled such that a case in which too much of a memory of the target node is occupied can be avoided, and the target node can run the network function with improved efficiency, the target node directly runs a network function that the target node has but is not running such that the target node can run the network function required by the user service.

It should be noted that, for other corresponding descriptions corresponding to the devices in the target node provided in this embodiment of the present disclosure, reference may be made to corresponding descriptions in FIG. 2 and FIG. 3, and details are not described herein again.

The apparatus for running a network function provided in this embodiment of the present disclosure may implement the foregoing provided method embodiments. For specific function implementation, refer to descriptions in the method embodiments. Details are not described herein again. The method and the apparatus for running a network function provided in the embodiments of the present disclosure may be applicable to switching a user service from a source node to a target node, but are not limited thereto.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for running a network function implemented at a target node, comprising:
    receiving, by a receiver of a target node from a source node, information about a network function used by a user service, the network function being a module that is used to provide the user service, the information about the network function carrying identifier information corresponding to the network function;
    downloading, by a processor coupled to the receiver of the target node, the module corresponding to the network function from a server in response to determining that the target node does not store the network function; and
    running, by the processor, the network function, wherein the module comprises one or more software functions that are used while providing the user service.

2. The method for running a network function according to claim 1, wherein the information about the network function comprises at least one of a name of the network function, an identity of the network function, a version of the network function, or parameter information required for running the network function.

3. The method for running a network function according to claim 1, wherein after receiving the module corresponding to the network function and running the network function, the method further comprises uninstalling, by a processor coupled to the receiver of the target node, the module corresponding to the network function when the user service is switched to another node.

4. The method for running a network function according to claim 1, wherein receiving the information about the network function required by the user service comprises receiving, by the receiver from the source node, a service quality required by the user service and the information about the network function required by the user service, and wherein the method further comprises running, by a processor coupled to the receiver of the target node, the network function when the service quality required by the user service is achieved.

5. The method for running a network function according to claim 4, wherein the method further comprises sending, by a transmitter of the target node to the source node, feedback information indicating that switching of the user service is not allowed when the service quality required by the user service is not achieved.

6. The method for running a network function according to claim 1, further comprising sending, by a transmitter of the target node to the source node, feedback information indicating that switching of the user service is allowed after running the network function.

7. The method for running a network function according to claim 1, wherein the information about the network function is protocol feature information.

8. A target node, comprising:
a receiver configured to receive information sent by a source node about a network function used by a user service, wherein the network function is a module that is used to provide the user service, the information about the network function carrying identifier information corresponding to the network function; and
a processor coupled to the receiver and configured to:
download the module corresponding to the network function from the server when the target node does not store the network function; and
run the network function after receiving the network function from a server when the network function is not running at the target node, the module comprising one or more software functions that are used while providing the user service.

9. The target node according to claim 8, wherein the information about the network function comprises at least one of a name of the network function, an identity of the network function, a version of the network function, parameter information required for running the network function.

10. The target node according to claim 9, wherein the receiver is further configured to receive a service quality used by the user service and the information such that the network function is run when the service quality that is required by the user service is achieved.

11. The target node according to claim 8, wherein the processor is further configured to uninstall the module corresponding to the network function when the user service is switched to another node.

12. The target node according to claim 8, wherein the receiver is further configured to receive a service quality required by the user service and the information about the network function required by the user service, and wherein the processor is further configured to run the network function when the service quality that is required by the user service is achieved.

13. The target node according to claim 12, further comprising a transmitter coupled to the processor and configured to send, to the source node, feedback information indicating that switching of the user service is not allowed when the service quality that is required by the user service is not achieved.

14. The target node according to claim 8, further comprising a transmitter coupled to the processor and configured to send, to the source node, feedback information indicating that switching of the user service is allowed.

15. The target node according to claim 8, wherein the information about the network function is protocol feature information.

16. The target node according to claim 8, wherein the processor is further configured to download the module corresponding to the network function from the server when the target node does not store the network function.

17. The target node according to claim 8, wherein the information about the network function comprises a service quality required by the user service, and wherein the processor is further configured to run the network function when the service quality that is required by the user service is achieved.

18. The target node according to claim 8, wherein the information about the network function comprises a service quality required by the user service, wherein the service quality comprises at least one of a bandwidth required by the user service, a throughput required by the user service, a transmission delay required by the user service, or an error rate required by the user service.

* * * * *